(12) United States Patent
Naim et al.

(10) Patent No.: US 7,920,679 B1
(45) Date of Patent: Apr. 5, 2011

(54) COMMUNICATION SYSTEM AND METHOD FOR NOTIFYING PERSONS OF AN EMERGENCY TELEPHONE CALL

(75) Inventors: Usman Muhammad Naim, Overland Park, KS (US); Nasir Mahmood Mirza, Overland Park, KS (US); Sameer Akbar Khan, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1464 days.

(21) Appl. No.: 11/346,019

(22) Filed: Feb. 2, 2006

(51) Int. Cl.
*H04M 11/00* (2006.01)

(52) U.S. Cl. .............. 379/45; 379/37; 379/40

(58) Field of Classification Search .......... 379/37–51; 340/506, 286.06, 505
See application file for complete search history.

(56) References Cited

U.S. PATENT DOCUMENTS

| | | | |
|---|---|---|---|
| 5,742,666 A | 4/1998 | Alpert | |
| 5,805,670 A | 9/1998 | Pons et al. | |
| 6,151,385 A | 11/2000 | Reich et al. | |
| 6,201,856 B1 | 3/2001 | Orwick et al. | |
| 6,745,021 B1 | 6/2004 | Stevens | |
| 6,774,784 B2 * | 8/2004 | Satoh | 340/506 |
| 6,775,356 B2 | 8/2004 | Salvucci et al. | |
| 2002/0042846 A1 | 4/2002 | Bottan et al. | |
| 2002/0086659 A1 * | 7/2002 | Lauper | 455/404 |
| 2003/0069002 A1 * | 4/2003 | Hunter et al. | 455/404 |
| 2004/0105529 A1 * | 6/2004 | Salvucci et al. | 379/45 |
| 2004/0203622 A1 | 10/2004 | Esque et al. | |
| 2005/0002499 A1 | 1/2005 | Ordille et al. | |
| 2005/0003797 A1 * | 1/2005 | Baldwin | 455/404.1 |
| 2005/0013418 A1 | 1/2005 | Chang et al. | |
| 2005/0151642 A1 | 7/2005 | Tupler et al. | |
| 2005/0259641 A1 * | 11/2005 | Beninato et al. | 370/354 |
| 2006/0133582 A1 * | 6/2006 | McCulloch | 379/45 |
| 2006/0284732 A1 * | 12/2006 | Brock-Fisher | 340/573.1 |

FOREIGN PATENT DOCUMENTS
WO 2004051976 6/2004
* cited by examiner

*Primary Examiner* — Melur Ramakrishnaiah (57) ABSTRACT

A communication system for notifying persons of an emergency telephone call is provided according to the invention. The communication system includes a communication network configured to receive a user-initiated emergency telephone call from a caller. The communication system further includes a notification system configured to receive the user-initiated emergency telephone call from the communication network, select one or more proximity communication devices based on one or more predetermined proximity criteria, and generate a notification communication to the one or more proximity communication devices. The notification communication notifies the one or more proximity communication devices of the user-initiated emergency telephone call.

40 Claims, 5 Drawing Sheets

COMMUNICATION SYSTEM AND METHOD FOR NOTIFYING PERSONS OF AN EMERGENCY TELEPHONE CALL

BACKGROUND OF THE INVENTION

1. Field of the Invention

The invention is related to emergency telephone calls, and in particular, to a system and method for notifying persons of an emergency telephone call.

2. Statement of the Problem

Telecommunications are widely used for emergencies. The 911 telephone number is a good example, as it has been widely used for emergency situations and can be used to communicate with police, fire, or medical personnel. Most persons know that in the event of an emergency, they can dial 911 and can immediately summon assistance. When a person places a call to an emergency telephone number, a dispatcher typically routes the call to an appropriate emergency responder, such as a police, fire, or ambulance department.

While this may be adequate in terms of meeting the emergency needs of the person, notification of other nearby persons is not triggered by the emergency telephone call. For example, in the event of an emergency call for a fire in a building, the notification of other persons is typically left to a fire alarm system. In many cases, a fire alarm system is adequate. However, if the fire alarm system is faulty or if persons are not in range of alarms, notification of other persons may not be satisfactorily achieved. Alternatively, if the emergency is the occurrence of a chemical spill, medical emergency, traffic collision, etc., then there may simply not be a notification system that will notify nearby persons.

In the prior art, there are reverse 911 systems that can be used to generate alarm or notification messages to various persons. However, the reverse 911 telephone calls of the prior art are prompted by an operator or other personnel. In the prior art, notification to additional persons of an emergency situation is not automatically generated upon the occurrence of an emergency telephone call. Notification in the event of an emergency situation is not immediate.

SUMMARY OF THE SOLUTION

A communication system for notifying persons of an emergency telephone call is provided according to some examples of the invention. The communication system comprises a communication network configured to receive a user-initiated emergency telephone call from a caller. The communication system further comprises a notification system configured to receive the user-initiated emergency telephone call from the communication network, select one or more proximity communication devices based on one or more predetermined proximity criteria, and generate a notification communication to the one or more proximity communication devices. The notification communication notifies the one or more proximity communication devices of the user-initiated emergency telephone call.

A communication system for notifying persons of an emergency telephone call is provided according to some examples of the invention. The communication system comprises a caller telephone device configured to generate a user-initiated emergency telephone call and an emergency call notification. The communication system further comprises a notification system configured to receive the emergency call notification from the caller telephone device, select one or more proximity communication devices based on one or more predetermined proximity criteria, and generate a notification communication to the one or more proximity communication devices. The notification communication notifies the one or more proximity communication devices of the user-initiated emergency telephone call.

A method for notifying persons of an emergency telephone call is provided according to some examples of the invention. The method comprises receiving a user-initiated emergency telephone call from a caller into a notification system. The method further comprises, in response, the notification system selecting one or more proximity communication devices based on one or more predetermined proximity criteria. The method further comprises the notification system generating a notification communication to the one or more proximity communication devices. The notification communication notifies the one or more proximity communication devices of the user-initiated emergency telephone call.

A method for notifying persons of an emergency telephone call is provided according to some examples of the invention. The method comprises receiving an emergency call notification from a caller into a notification system. The emergency call notification is transmitted by a telephone device of the caller substantially in parallel with a user-initiated emergency telephone call. The method further comprises, in response, the notification system selecting one or more proximity communication devices based on one or more predetermined proximity criteria. The method further comprises the notification system generating a notification communication to the one or more proximity communication devices. The notification communication notifies the one or more proximity communication devices of the user-initiated emergency telephone call.

DESCRIPTION OF THE DRAWINGS

The same reference number represents the same element on all drawings.

DETAILED DESCRIPTION OF THE INVENTION

FIGS. 1-5 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
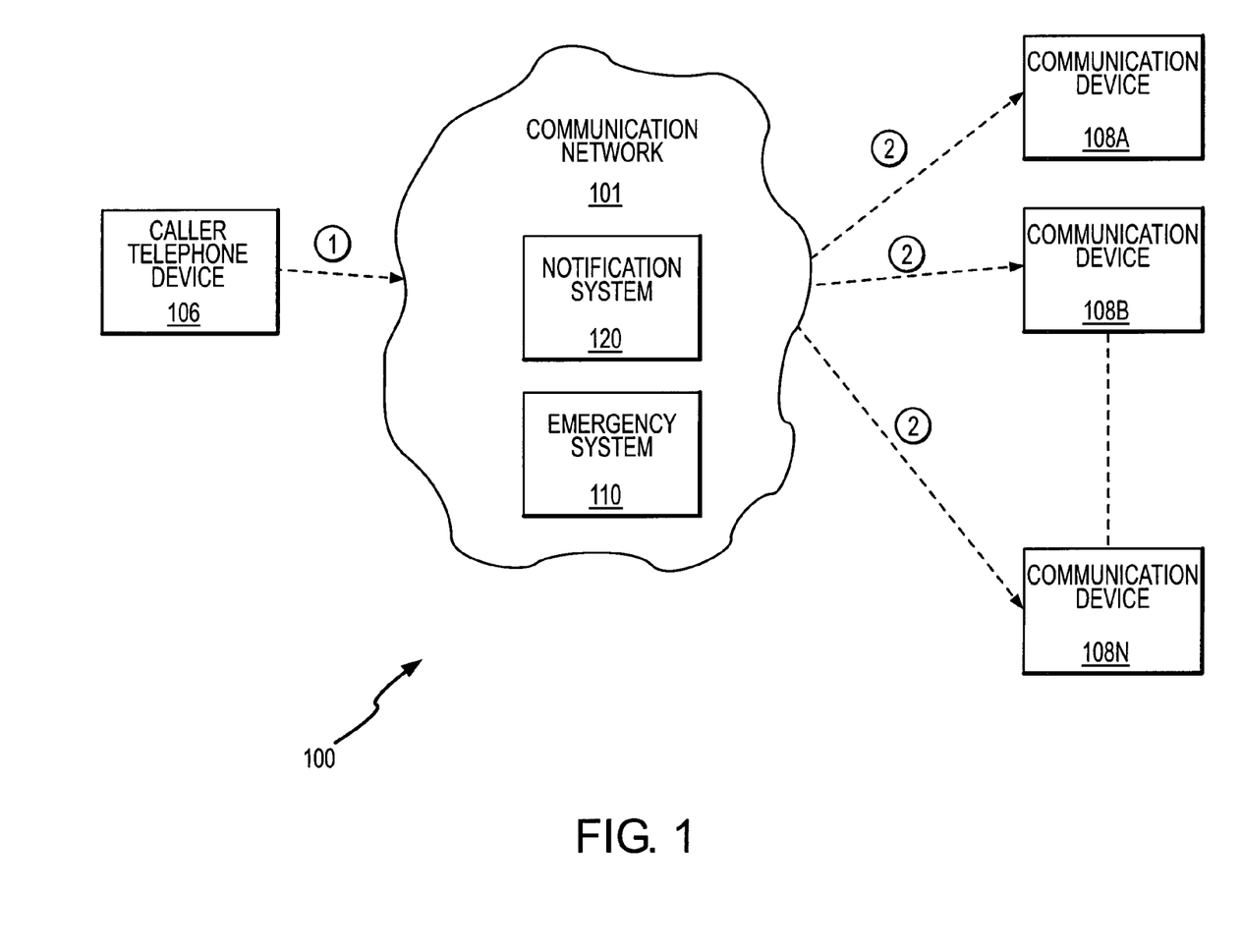
FIG. 1 shows a communication system for notifying persons of an emergency telephone call according to an embodiment of the invention.

FIG. 1 shows a communication system 100 for notifying persons of an emergency telephone call according to an embodiment of the invention. The communication system 100 includes a communication network 101 and includes a caller telephone device 106 that can communicate with the communication network 101. In addition, the communication system 100 can include communication devices 108A-108N that also communicate with the communication network 101. Further, the communication network 101 includes a notification system 120.

The notification system 120 receives either a user-initiated emergency telephone call or an emergency call notification (see FIG. 3 and the accompanying discussion below). The notification system 120 can comprise a specially configured component of the communication network 101. Alternatively, the notification system 120 can comprise a standalone device or platform within the communication network 101.

The caller telephone device 106 can comprise any communication device capable of placing a user-initiated emergency telephone call. The caller telephone device 106 can comprise a wireline or wireless telephone device.

The communication devices 108A-108N receive communications from the communication network 101. In one embodiment, the communication devices 108A-108N comprise wireline or wireless telephone devices. For example, the communication devices 108A-108N can comprise cellular or satellite telephones. Alternatively, the communication devices 108A-108N can comprise other electronic communication devices, including pagers, PDAs, Voice Over Internet Protocol (VOIP) capable computers, etc.

In operation, the caller telephone device 106 places an emergency telephone call (1) to the communication network 101. For example, the emergency telephone call (1) can comprise a 911 (or other N11) emergency telephone call. In response, the communication network 101 selects one or more proximity communication devices 108 from the communication devices 108A-108N. The selection is based on one or more predetermined proximity criteria (see FIG. 2 and the accompanying discussion below). The communication network 101 then transmits a notification communication (2) to the selected one or more proximity communication devices 108. The notification communication (2) notifies the one or more proximity communication devices of the user-initiated emergency telephone call (1).

The notification communication (2) can comprise an audio message, a text message, or an instant message, for example. In one embodiment, a notification message (2) can comprise one or more telephone calls and can include pre-recorded or live voice messages. In another embodiment, a notification message (2) can comprise non-audible messages, such as text messages, for example. Some examples of a text message include a page, a fax, or an e-mail. In one embodiment, a notification communication (2) can comprise an instant message such as a Short Message Service (SMS) message, for example. Therefore, it should be understood that a notification communication (2) can comprise any type of communication and is not strictly limited to telephone calls.

Advantageously, the communication system 100 can transmit the notification communication (2) to the one or more proximity communication devices 108A-108N immediately and automatically upon the occurrence of the emergency telephone call. Persons who are relatively near to the caller may need the information to respond appropriately, including rendering assistance, evacuating the area, making room for or assisting emergency personnel, etc. No human operator or intervention is required. Substantially no time will elapse between the emergency telephone call and the transmission of the notification communication (2).

Figure 2:
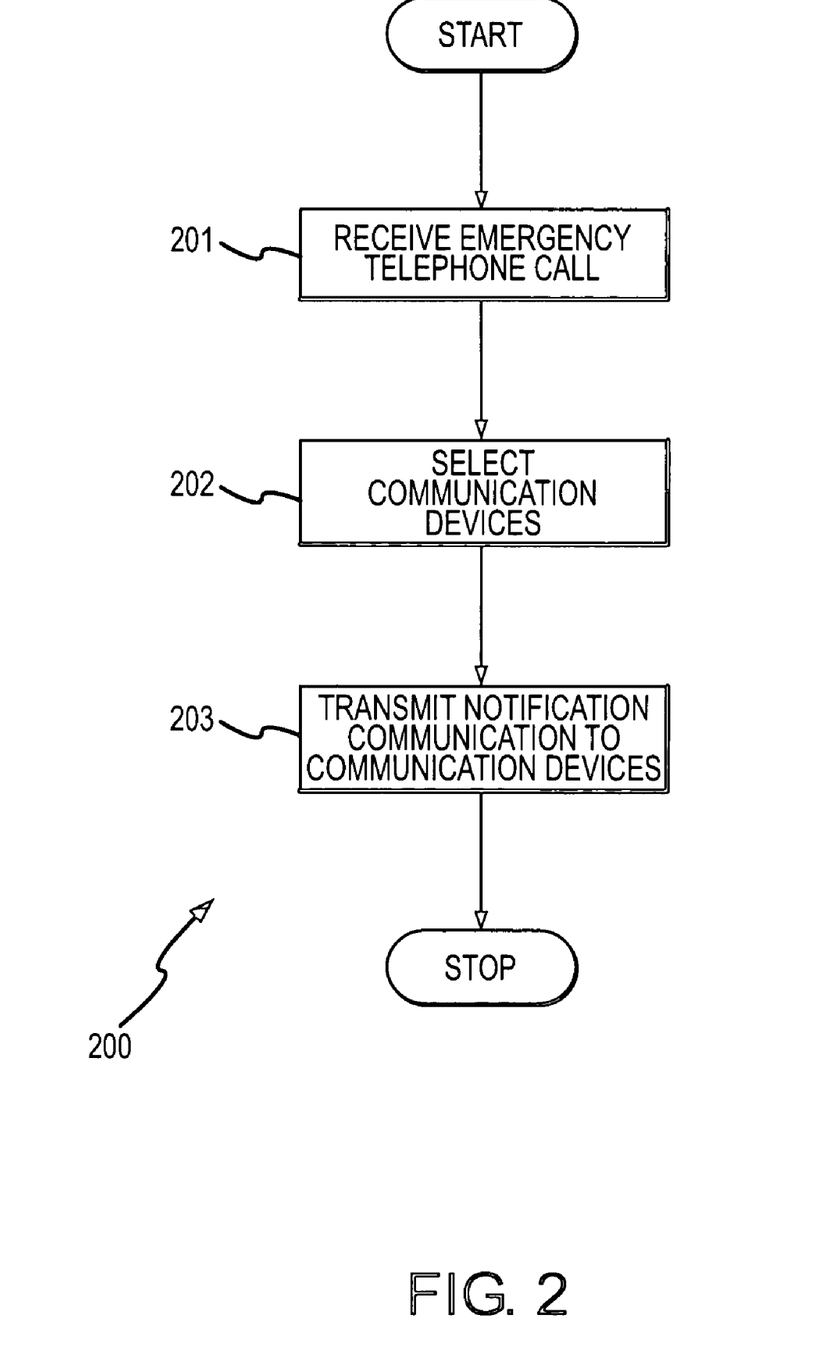
FIG. 2 is a flowchart of a method for notifying persons of an emergency telephone call according to an embodiment of the invention.

FIG. 2 is a flowchart 200 of a method for notifying persons of an emergency telephone call according to an embodiment of the invention. In step 201, the communication network 101 receives an emergency telephone call (1) from a caller telephone device 106.

In step 202, in response to receiving the emergency telephone call (1), the communication network 101 selects one or more proximity communication devices 108. The communication devices 106 are selected based on one or more predetermined proximity criteria. The criteria can include, for example, a subscriber status, a geographical proximity, and/or predetermined communication device groupings. Other predetermined proximity criteria are contemplated and are within the scope of the description and claims.

Where the predetermined proximity criteria includes geographical proximity, the communication network 101 can determine a caller location and can then determine which communication devices 108 are within a predetermined distance of the caller location. Subsequently, the communication network 101 selects the communication devices 108 that are within the predetermined distance from the caller location. As a result, persons who are in the geographic location of the caller can be notified of the occurrence of the emergency telephone call.

Alternatively, the predetermined proximity criteria can specify a geographically proximate transmitter device that is in range of the caller telephone device 106. Where at least some of the communication devices 108 comprise wireless devices, the communication network 101 can select a transmitter device having a transmission area that includes the caller telephone device 106. Subsequently, all communication devices 108 within this transmission area receive the notification communication (2).

In another alternative, the predetermined proximity criteria includes a predetermined communication device grouping. The grouping can include communication devices selected according to criteria including locality, such as a particular institutional facility, department, etc. Moreover, the grouping can group communication devices together according to physical characteristics, such as by a communication channel, frequency, cable loop or branch, etc.

In step 203, the communication network 101 transmits a notification communication (2) to the selected communication devices 108. The notification communication (2) notifies the communication devices 108 of the user-initiated emergency telephone call (1). In addition, the notification communication (2) can include other information. The notification communication (2) can include, for example, the caller's telephone number, the caller's location, and/or the emergency call type. Other information can be included in the notification communication (2) and is within the scope of the description and claims.

Figure 3:
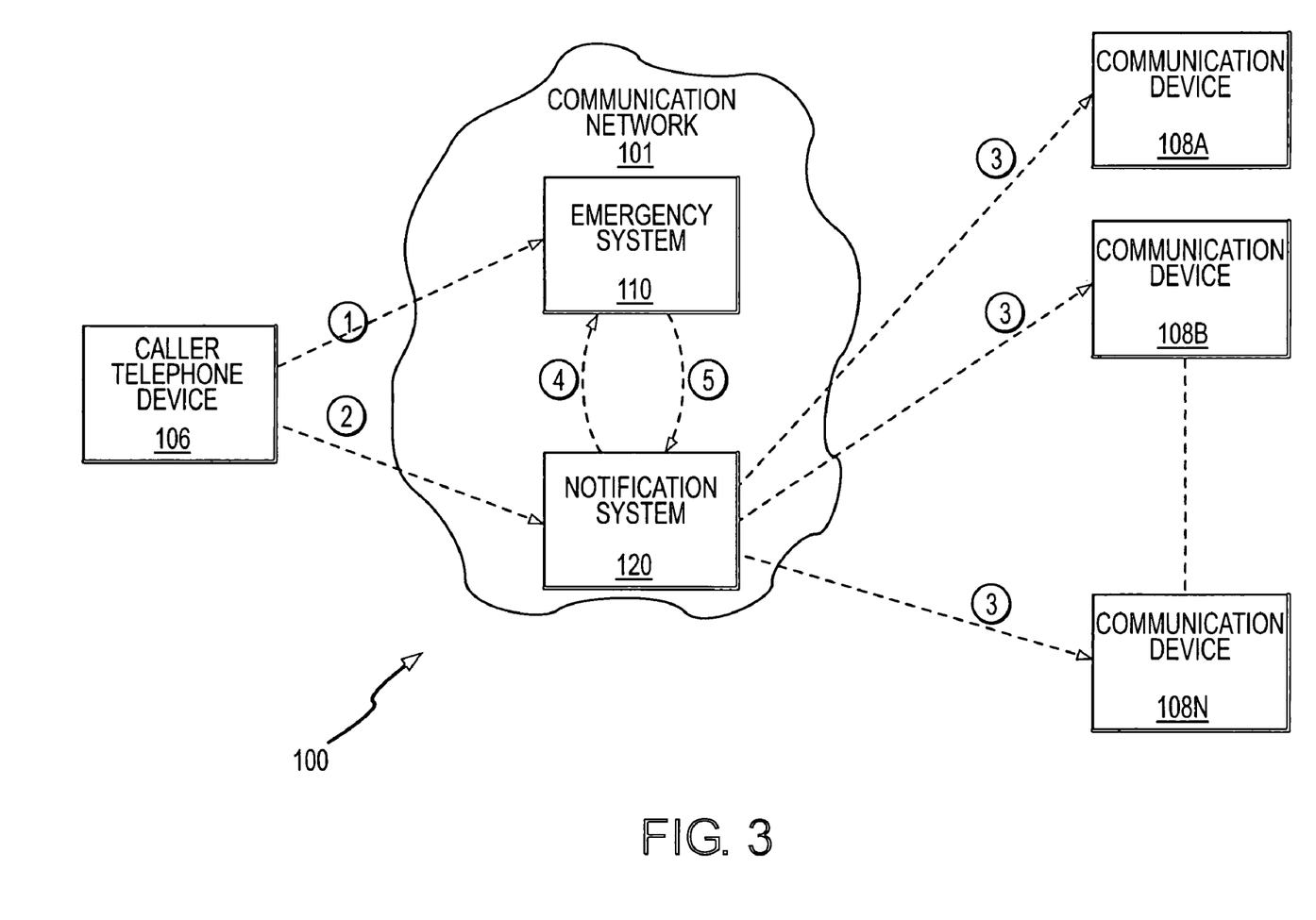
FIG. 3 shows the communication system according to an embodiment of the invention.

FIG. 3 shows the communication system 100 according to an embodiment of the invention. Elements in common with previous figures share reference numbers. The communication network 101 in this embodiment additionally includes an emergency system 110 and a notification system 120.

The caller telephone device 106 in this embodiment generates and transmits two messages for an emergency call. The caller telephone device 106 generates and transmits the emergency telephone call, as previously discussed, and the emergency system 110 receives the emergency telephone call (1) from the caller telephone device 106. In this embodiment, the emergency system 110 receives and acts on the emergency telephone call (1), including dispatching appropriate emergency responders. In addition, the caller telephone device 106 generates an emergency call notification (2) and transfers the emergency call notification (2) to the notification system 120.

The emergency call notification (2) therefore is received in the notification system 120 directly from the caller telephone device 106.

The emergency call notification (2) in one embodiment is triggered by the user-initiated emergency telephone call. The generation of the notification communication (2) therefore indicates that the emergency telephone call (1) has been generated by the caller telephone device 106.

In response to the notification communication (2), the notification system 120 selects communication devices 108, as previously discussed. The notification system 120 then transmits a notification communication (3) to the selected communication devices 108. The notification communication (3) can comprise the same communication as discussed as the notification communication (2) of FIGS. 1 and 2.

Figure 4:
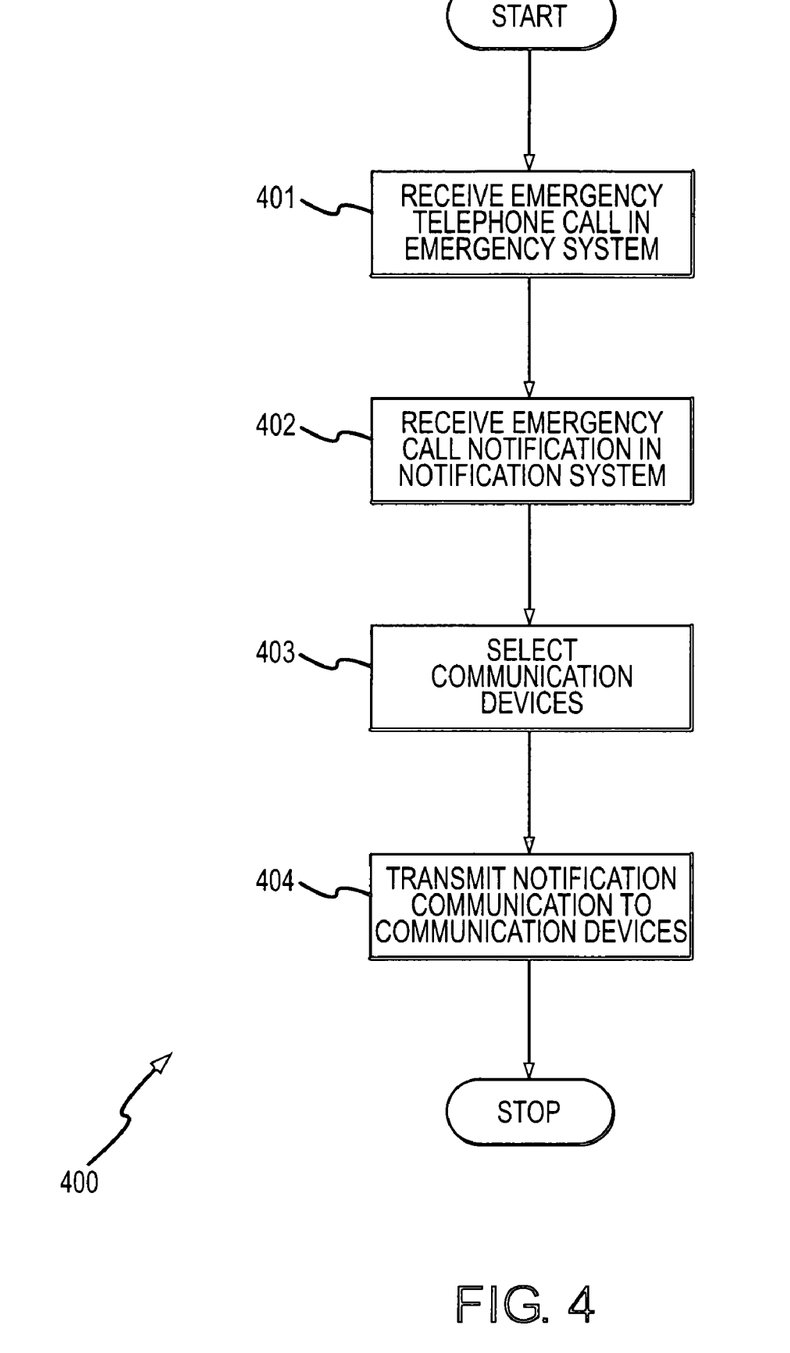
FIG. 4 is a flowchart of a method for notifying persons of an emergency telephone call according to an embodiment of the invention.

FIG. 4 is a flowchart 400 of a method for notifying persons of an emergency telephone call according to an embodiment of the invention. In step 401, the emergency system 110 receives an emergency telephone call (1) from a caller telephone device 106.

In step 402, the notification system 120 receives an emergency call notification (2) from the caller telephone device 106. The emergency call notification (2) indicates that the caller telephone device 106 has generated an emergency telephone call. The emergency call notification (2) can be transmitted by the caller telephone device 106 substantially simultaneously with the emergency telephone call (1).

In step 403, in response to receiving the emergency call notification (2), the notification system 120 selects one or more proximity communication devices 108. The communication devices 106 are selected based on one or more predetermined proximity criteria, as previously discussed. The criteria can include, for example, a subscriber status, a geographical proximity, and/or predetermined communication device groupings, as previously discussed.

In step 404, the notification system 120 transmits a notification communication (3) to the selected communication devices 108. The notification communication (3) notifies the communication devices 108 of the user-initiated emergency telephone call (1). In addition, the notification communication (3) can include other information, as previously discussed.

Figure 5:
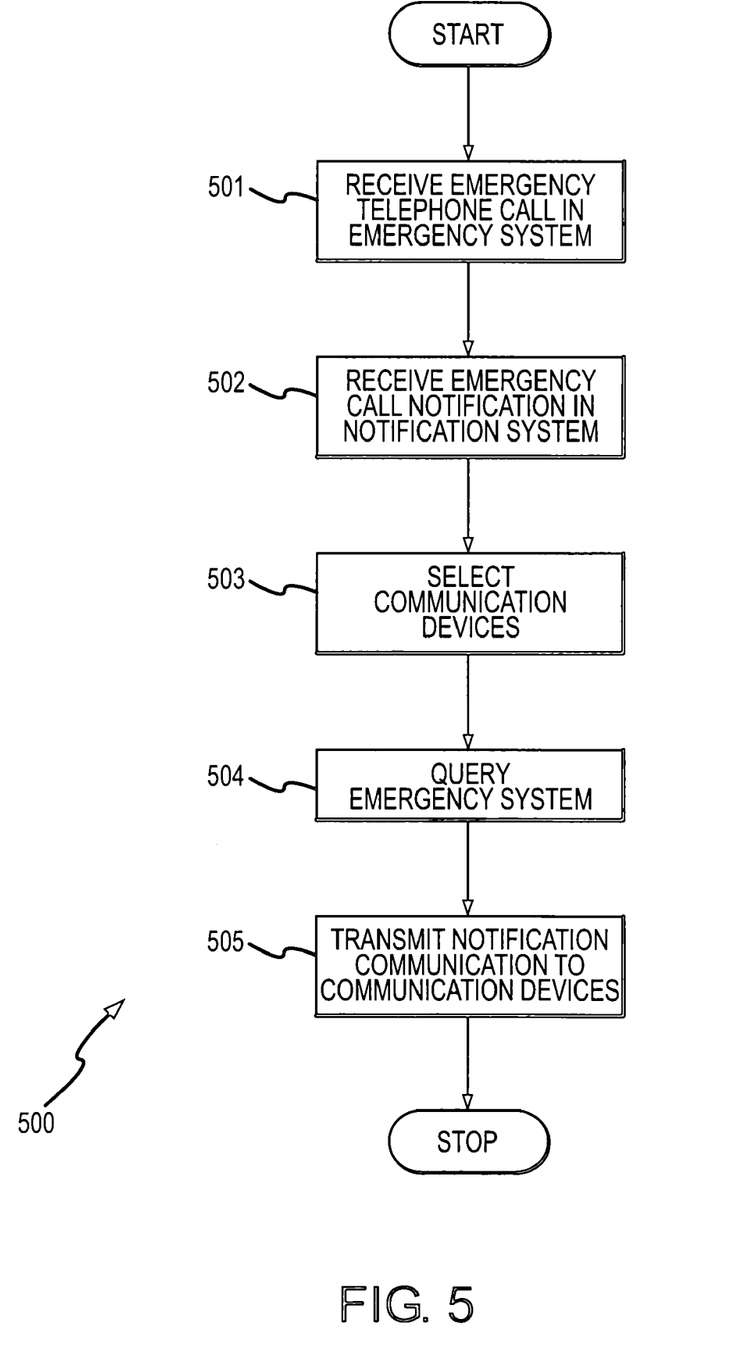
FIG. 5 is a flowchart of a method for notifying persons of an emergency telephone call according to an embodiment of the invention.

FIG. 5 is a flowchart 500 of a method for notifying persons of an emergency telephone call according to an embodiment of the invention. In step 501, the emergency system 110 receives an emergency telephone call (1) from a caller telephone device 106, as previously discussed.

In step 502, the notification system 120 receives an emergency call notification (2) from the caller telephone device 106, as previously discussed.

In step 503, in response to receiving the emergency call notification (2), the notification system 120 selects one or more proximity communication devices 108, as previously discussed.

In step 504, the notification system 120 queries (4) the emergency system 110. The emergency system 110 responds with a reply (5) that provides information to the notification system 120. The querying (4) can request confirmation that the caller telephone device 106 established a connection to the emergency system 110 and that the emergency telephone call was completed. Alternatively, or in addition, the querying (4) can determine an emergency call type. Consequently, one or both of the emergency call type and an emergency call completion information can be included in a notification communication (3).

In step 505, the notification system 120 transmits a notification communication (3) to the selected communication devices 108, as previously discussed.

The invention claimed is:

1. A communication system for notifying persons of an emergency telephone call, the system comprising:
   a communication network configured to receive a user-initiated emergency telephone call from a caller device operated by a caller; and
   a notification system configured to receive the user-initiated emergency telephone call from the communication network, transfer a query for delivery to an emergency system requesting confirmation that the caller device established a connection to the emergency system, receive a response transmitted from the emergency system indicating whether or not the caller device established the connection to the emergency system, determine a location of the caller device, select one or more proximity communication devices from a predetermined communication device grouping based on one or more predetermined proximity criteria, wherein the one or more predetermined proximity criteria comprises a geographical proximity to the location, and generate a notification communication to the one or more proximity communication devices, with the notification communication notifying the one or more proximity communication devices of the user-initiated emergency telephone call.

2. The system of claim 1, with the one or more predetermined proximity criteria including a subscriber status.

3. The system of claim 1, with the one or more predetermined proximity criteria including a geographically proximate transmitter device that is in range of the caller.

4. The system of claim 1, with the notification communication including the location of the caller device.

5. The system of claim 1, with the notification communication including a caller telephone number.

6. The system of claim 1, with the notification communication including an emergency call type.

7. The system of claim 1, wherein the communication network configured to receive the user-initiated emergency telephone call from the caller device operated by the caller comprises the emergency system in the communication network configured to receive the user-initiated emergency telephone call from the caller device operated by the caller.

8. The system of claim 1, wherein the notification communication indicates whether or not the caller device established the connection to the emergency system.

9. The system of claim 7, wherein the query further requests confirmation that the user-initiated emergency telephone call was completed, and the response transmitted from the emergency system indicates whether or not the user-initiated emergency telephone call was completed.

10. A communication system for notifying persons of an emergency telephone call, the system comprising:
   a caller telephone device configured to generate a user-initiated emergency telephone call and an emergency call notification; and
   a notification system configured to receive the emergency call notification from the caller telephone device, query an emergency system that receives the user-initiated emergency telephone call, verify that the caller telephone device established a connection to the emergency system based on the query, determine a location of the caller telephone device, select one or more proximity communication devices from a predetermined communication device grouping based on one or more predetermined proximity criteria, wherein the one or more predetermined proximity criteria comprises a geographical proximity to the location, and generate a notification communication to the one or more proximity communication devices, with the notification communication notifying the one or more proximity communication devices of the user-initiated emergency telephone call.

11. The system of claim 10, with the one or more predetermined proximity criteria including a subscriber status.

12. The system of claim 10, with the one or more predetermined proximity criteria including a geographically proximate transmitter device that is in range of the caller.

13. The system of claim 10, with the notification communication including the location of the caller telephone device.

14. The system of claim 10, with the notification communication including a caller telephone number.

15. The system of claim 10, with the notification communication including an emergency call type.

16. The system of claim 10, further comprising the emergency system that receives the user-initiated emergency telephone call.

17. The system of claim 10, with the notification system being configured to include information in the notification communication that the user-initiated emergency telephone call was established.

18. The system of claim 10, with the notification communication including the geographical proximity.

19. The system of claim 10, with the notification system being further configured to determine an emergency call type based on the query and include the emergency call type in the notification communication.

20. The system of claim 10, with the notification system being configured to verify an emergency call completion based on the query and include emergency call completion information in the notification communication.

21. A method for notifying persons of an emergency telephone call, the method comprising:
receiving a user-initiated emergency telephone call from a caller device operated by a caller into a notification system;
in response, the notification system determining a location of the caller device and selecting one or more proximity communication devices from a predetermined communication device grouping based on one or more predetermined proximity criteria, wherein the one or more predetermined proximity criteria comprises a geographical proximity to the location;
the notification system transferring a query for delivery to an emergency system that receives the user-initiated emergency telephone call, wherein the query requests confirmation that the caller device established a connection to the emergency system, and receiving a response transmitted from the emergency system indicating whether or not the caller device established the connection to the emergency system; and
the notification system generating a notification communication to the one or more proximity communication devices, with the notification communication notifying the one or more proximity communication devices of the user-initiated emergency telephone call.

22. The method of claim 21, with the one or more predetermined proximity criteria including a subscriber status.

23. The method of claim 21, with the one or more predetermined proximity criteria including a geographically proximate transmitter device that is in range of the caller.

24. The method of claim 21, with the notification communication including the location of the caller device.

25. The method of claim 21, with the notification communication including a caller telephone number.

26. The method of claim 21, with the notification communication including an emergency call type.

27. The method of claim 21, wherein the notification communication indicates whether or not the caller device established the connection to the emergency system.

28. The method of claim 21, wherein the query requests confirmation that the user-initiated emergency telephone call was completed, and the response transmitted from the emergency system indicates whether or not the user-initiated emergency telephone call was completed.

29. The method of claim 21, wherein the query requests an emergency call type associated with the user-initiated emergency telephone call, and the response transmitted from the emergency system indicates the emergency call type.

30. A method for notifying persons of an emergency telephone call, the method comprising:
receiving an emergency call notification from a caller into a notification system, with the emergency call notification being transmitted by a telephone device of the caller substantially in parallel with a user-initiated emergency telephone call;
in response, the notification system determining a location of the telephone device and selecting one or more proximity communication devices from a predetermined communication device grouping based on one or more predetermined proximity criteria, wherein the one or more predetermined proximity criteria comprises a geographical proximity to the location;
querying an emergency system that receives the user-initiated emergency telephone call;
verifying that the telephone device established a connection to the emergency system based on the query; and
the notification system generating a notification communication to the one or more proximity communication devices, with the notification communication notifying the one or more proximity communication devices of the user-initiated emergency telephone call.

31. The method of claim 30, with the one or more predetermined proximity criteria including a subscriber status.

32. The method of claim 30, with the one or more predetermined proximity criteria including a geographically proximate transmitter device that is in range of the caller.

33. The method of claim 30, with the notification communication including the location of the telephone device.

34. The method of claim 30, with the notification communication including a caller telephone number.

35. The method of claim 30, with the notification communication including an emergency call type.

36. The method of claim 30, with the selecting the one or more proximity communication devices further comprising:
determining one or more proximity communication devices within the geographical proximity of the location.

37. The method of claim 30, further comprising:
including information in the notification communication that the user-initiated emergency telephone call was established.

38. The method of claim 30, with the notification communication including the geographical proximity.

39. The method of claim 30, further comprising:
determining an emergency call type based on the query; and including the emergency call type in the notification communication.

40. The method of claim 30, further comprising:

verifying an emergency call completion based on the query; and including emergency call completion information in the notification communication.

* * * * *